(12) United States Patent
Poulin et al.

(10) Patent No.: US 7,963,793 B2
(45) Date of Patent: Jun. 21, 2011

(54) HYBRID/ELECTRIC VEHICLE CHARGE HANDLE LATCH MECHANISM

(75) Inventors: Marc Poulin, Chesterfield, MI (US);
John F. Nathan, Highland Township, MI (US); Keith Kwasny, Northville, MI (US); Slobadan Pavlovic, Novi, MI (US); Scott Selesky, Columbiaville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/883,805

(22) Filed: Sep. 16, 2010

(65) Prior Publication Data

US 2011/0070758 A1    Mar. 24, 2011

Related U.S. Application Data

(60) Provisional application No. 61/245,467, filed on Sep. 24, 2009.

(51) Int. Cl.
*H01R 13/62* (2006.01)
(52) U.S. Cl. ............. 439/352; 439/372; 439/34
(58) Field of Classification Search ............ 439/352, 439/372, 310, 34
See application file for complete search history.

(56) References Cited

U.S. PATENT DOCUMENTS

| | | | | |
|---|---|---|---|---|
| 4,682,847 A | * | 7/1987 | Moore et al. | 439/271 |
| 5,350,312 A | * | 9/1994 | Kuno et al. | 439/310 |
| 5,417,579 A | | 5/1995 | Yoshioka et al. | |
| 5,429,524 A | * | 7/1995 | Wakata et al. | 439/310 |
| 5,433,623 A | * | 7/1995 | Wakata et al. | 439/310 |
| 5,458,496 A | * | 10/1995 | Itou et al. | 439/34 |
| 5,536,173 A | * | 7/1996 | Fujitani et al. | 439/34 |
| 5,545,049 A | * | 8/1996 | Hasegawa et al. | 439/310 |
| 5,556,284 A | | 9/1996 | Itou et al. | |
| 5,558,533 A | * | 9/1996 | Hashizawa et al. | 439/310 |
| 5,573,417 A | * | 11/1996 | Hashizawa et al. | 439/310 |
| 5,577,920 A | * | 11/1996 | Itou et al. | 439/34 |
| 5,637,977 A | * | 6/1997 | Saito et al. | 320/109 |
| 5,639,256 A | | 6/1997 | Endo et al. | |
| 5,664,960 A | * | 9/1997 | Fukushima | 439/310 |
| 6,123,569 A | * | 9/2000 | Fukushima et al. | 439/456 |
| 6,203,355 B1 | | 3/2001 | Neblett et al. | |
| 6,283,781 B1 | | 9/2001 | Mori | |

* cited by examiner

*Primary Examiner* — Gary F. Paumen
(74) *Attorney, Agent, or Firm* — Brooks Kushman P.C.

(57) ABSTRACT

A charge handle for use in charging a plug-in vehicle having a charge port includes a body having a receptacle for engaging the charge port to provide for charging the vehicle. A latch rotatably mounted to the body has a first end for securing the engagement of the receptacle to the charge port, and has a second end. An actuator lever is rotatably mounted to the body. The actuator lever has a first end connected to the second end of the latch, and has a second end. A trigger mechanism includes a trigger located on the opposite side of the body from the latch. The trigger mechanism is arranged such that depressing the trigger pushes the second end of the actuator lever to rotate the actuator lever to cause the latch to rotate and disengage the receptacle from the charge port.

18 Claims, 2 Drawing Sheets

HYBRID/ELECTRIC VEHICLE CHARGE HANDLE LATCH MECHANISM

CROSS-REFERENCE TO RELATED APPLICATION

This application claims the benefit of U.S. provisional Application No. 61/245,467, filed Sep. 24, 2009. The disclosure of which is incorporated in its entirety by reference herein.

TECHNICAL FIELD

The invention relates to latch mechanisms for charge handles, for use in charging hybrid/electric vehicles.

BACKGROUND

A hybrid vehicle may include an electrical power source in addition to the internal combustion engine. In more detail, the hybrid vehicle may include a gasoline engine, fuel tank, electric motor, batteries, transmission, and electric generator. Various approaches to combining the electrical power source and the internal combustion engine are known, such as a parallel hybrid in which the engine and electric motor can both simultaneously drive the transmission and the series hybrid in which the engine drives the electric generator which charges the batteries or powers the electric motor to drive the transmission.

Some hybrid vehicles are configured to allow connecting the vehicle to an external electric power supply, that is, the hybrid vehicle may be plugged in for charging.

There are also battery electric vehicles that are fully powered by the electrical power source. The battery electric vehicle is configured to allow connecting the vehicle to an external power supply, that is, the battery electric vehicle may be plugged in for charging.

In the case of hybrid vehicles or battery vehicles of the type that may be plugged in for charging, the vehicle includes a charge port. A charge handle connects to an external electrical supply, with a cord or wire. In order to connect the vehicle to the external electrical power supply, the charge handle is received at the charge port (analogous to the way that a gasoline handle/nozzle at a gas station is received at the fuel filler port on a vehicle). The charge handle typically includes a latch mechanism for latching the charge handle to the charge port.

An existing latch mechanism has a top-mounted button or trigger mechanism, with a simple pivot design, to provide the latch/release mechanism. Other existing latch mechanisms also have a simple pivot design.

Background information may be found in U.S. Pat. Nos. 6,203,355; 5,417,579; 5,639,256; 6,283,781; and 5,556,284.

SUMMARY

In one embodiment, the invention provides a charge handle for use in charging hybrid (or electric) vehicles, including a latch mechanism having a bottom-mounted trigger mechanism, with a simplified geometry or configuration, and that provides for a reversal of the travel associated with top mounted buttons or trigger mechanisms.

In one embodiment, the invention provides a charge handle for use in charging a plug-in vehicle having a charge port. The charge handle comprises a body including a receptacle for engaging the charge port to provide for charging the vehicle. The charge handle further comprises a latch rotatably mounted to the body. The latch has a first end for securing the engagement of the receptacle to the charge port and has a second end. An actuator lever is rotatably mounted to the body. The actuator lever has a first end connected to the second end of the latch and has a second end.

The charge handle further comprises a trigger mechanism including a trigger located on the opposite side of the body from the latch. The trigger mechanism is arranged such that depressing the trigger pushes the second end of the actuator lever to rotate the actuator lever to cause the latch to rotate and disengage the receptacle from the charge port.

At the more detailed level, any embodiments of the invention may include one or more of various additional features. For example, the first end of the latch may form a catch with a positive engagement member. The second end of the latch and the first end of the actuator lever may compose a pin and slot arrangement such that rotating the actuator lever causes the latch to rotate.

Further, the charge handle may include a housing enclosing the body. The housing and the body may be separate or integral.

The trigger mechanism may further comprise a roller positioned such that depressing the trigger engages the roller to push the second end of the actuator lever. The trigger mechanism may further comprise a spring positioned to bias the trigger such that depressing the trigger occurs against the spring bias.

In one embodiment, the body has an elongated shape and includes a forward portion and a rearward portion. The receptacle is located at the forward portion. In more detail, one or more additional features may be included. In one feature, the latch is rotatably mounted to the body at the forward portion and extends in the longitudinal direction. The first end of the latch may form a catch with a positive engagement member, with the catch extending forward beyond the receptacle to secure the receptacle to the charge port.

Further, the actuator lever may be rotatably mounted to the body at the forward portion and extend in the transverse direction across the body. Further, the second end of the latch and the first end of the actuator lever may compose a pin and slot arrangement such that rotating the actuator lever causes the latch to rotate. The trigger may extend in the longitudinal direction along the rearward portion of the body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
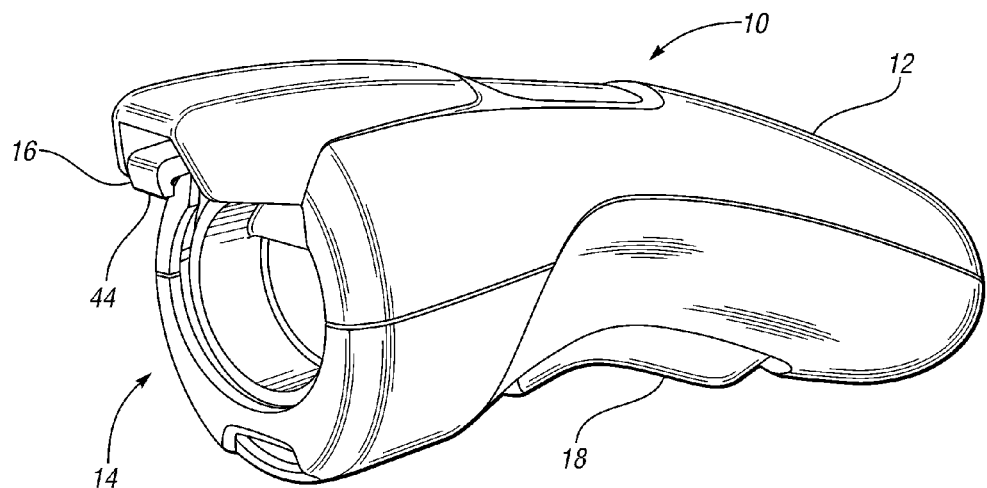
FIG. 1 illustrates an embodiment of a charge handle for use in charging hybrid vehicles, including a latch mechanism having a bottom-mounted trigger mechanism.
Figure 2:
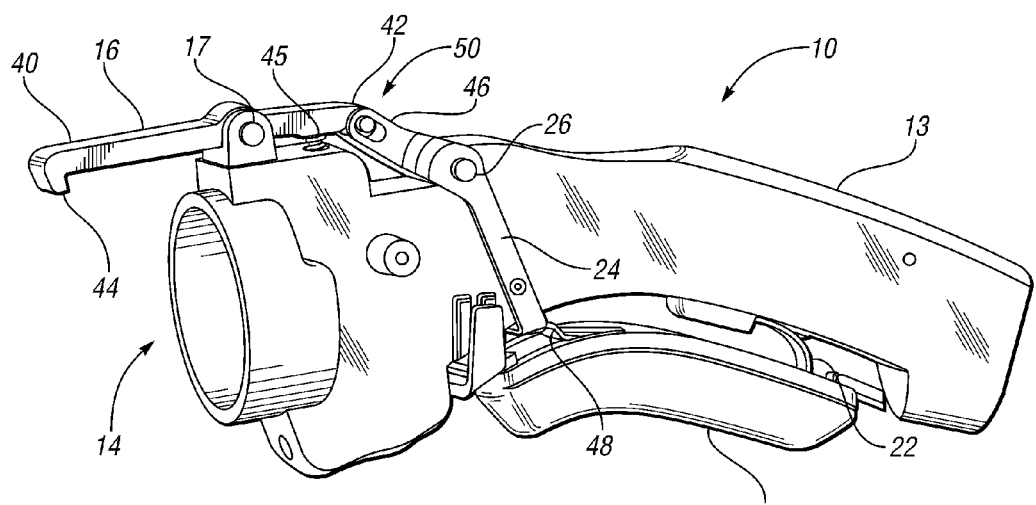
FIG. 2 illustrate the charge handle with the housing removed to show the latch mechanism in further detail.
Figure 3:
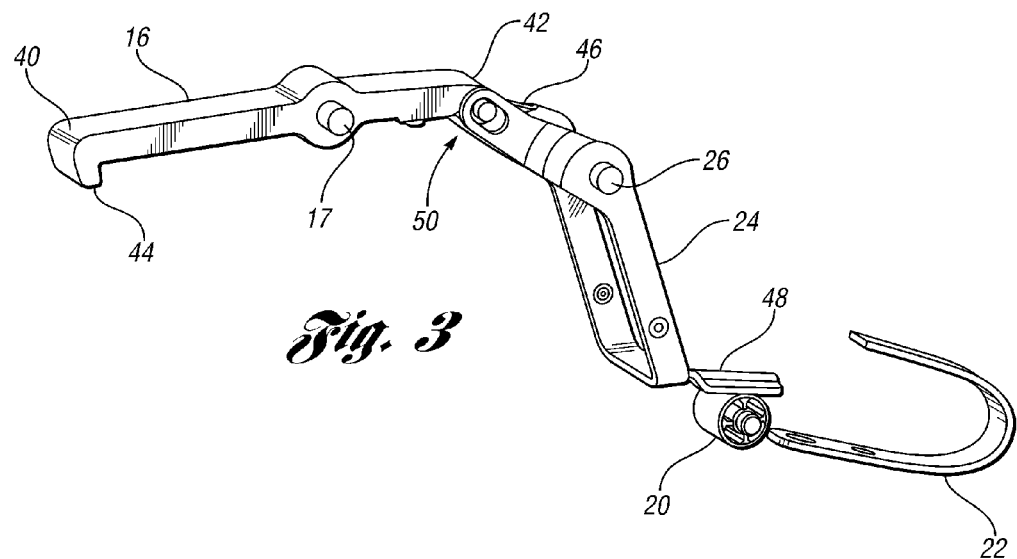
FIG. 3 illustrates the latch mechanism.

With reference to FIGS. 1-3, a charge handle 10 for use in charging a plug-in vehicle having a charge port is illustrated. The charge handle 10 includes a housing 12. The housing 12 encloses a body 13. The body 13 has an elongated shape, and includes a forward portion and a rearward portion. The body 13 includes a receptacle 14, at the body forward portion. The receptacle 14 is for engaging the charge port on the plug-in vehicle to provide for charging the vehicle.

Charge handle 10 further includes a latch 16 rotatably mounted to the body forward portion. The latch 16 is mounted at pivot connection 17. The latch 16 extends in the longitudinal direction. Other main components of charge handle 10 include trigger 18, and as best shown in FIG. 3, roller 20 and spring 22. An actuator lever 24 is rotatably mounted to the body forward portion. The actuator lever 24 is mounted at pivot pin 26. The actuator lever 24 extends in the transverse direction across the body 13.

The latch 16 has a first end 40. The latch first end 40 is for securing the engagement and connection of the receptacle 14 to the charge port. The latch 16 also has a second end 42. In more detail, the first end 40 of latch 16 forms a catch with a positive engagement member 44. The catch and member 44 extend beyond the receptacle 14 to secure the receptacle 14 to the charge port.

The actuator lever 24 has a first end 46. Actuator lever first end 46 is connected to the second end 42 of the latch 16. The actuator lever 24 also has a second end 48. The second end 42 of the latch 16 and the first end 46 of the actuator lever 24 compose a pin and slot arrangement 50. Rotating the actuator lever 24 about pivot pin 26 causes the latch 16 to rotate as further explained below.

The overall latch mechanism includes the latch 16 and the trigger mechanism which includes trigger 18. Trigger 18 is provided for disengaging/disconnecting charge handle 10 from the charge port. The trigger 18 is located on the opposite side of the body 13 from the latch 16. The trigger 18 extends in the longitudinal direction along the rearward portion of the body 13.

The trigger mechanism is arranged such that depressing the trigger 18 pushes the second end 48 of the actuator lever 24 to rotate the actuator lever 24 to cause the latch 16 to rotate and disengage the receptacle 14 from the charge port. Put another way, trigger 18 is depressed to overpower spring 22, and push roller 20 against actuator lever 24. The latch 16 is biased by latch return spring 45.

Figure 4:
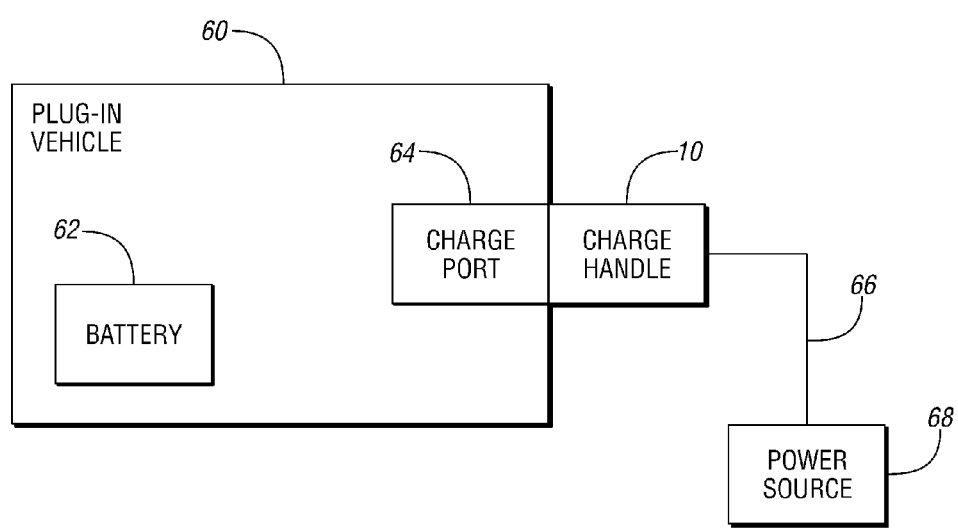
FIG. 4 illustrates a plug-in vehicle having a charge port and a battery, and a charge handle connecting a power source to the charge port.

FIG. 4 illustrates a plug-in vehicle 60 having a battery 62 and a charge port 64. The charge handle 10 is shown connecting the charge port 64 with cord 66 to power source 68. In general, electrical operation/cooperation of power source 68, cord 66, charge handle 10, charge port 64, and battery 62 takes place in any suitable manner as appreciated by one of ordinary skill in the art. Embodiments of the invention provide a latch mechanism having a trigger mechanism mounted opposite the latch, with a simplified geometry or configuration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charge handle for use in charging a plug-in vehicle having a charge port, the charge handle comprising:
   a body including a receptacle for engaging the charge port to provide for charging the vehicle;
   a latch rotatably mounted to the body, the latch having a first end for securing the engagement of the receptacle to the charge port and having a second end;
   an actuator lever rotatably mounted to the body, the actuator lever having a first end connected to the second end of the latch and having a second end; and
   a trigger mechanism including a trigger located on the opposite side of the body from the latch, the trigger mechanism being arranged such that depressing the trigger pushes the second end of the actuator lever to rotate the actuator lever to cause the latch to rotate and disengage the receptacle from the charge port.

2. The charge handle of claim 1 wherein the first end of the latch forms a catch with a positive engagement member.

3. The charge handle of claim 1 wherein the second end of the latch and the first end of the actuator lever compose a pin and slot arrangement such that rotating the actuator lever causes the latch to rotate.

4. The charge handle of claim 1 further comprising:
   a housing enclosing the body.

5. The charge handle of claim 1 wherein the trigger mechanism further comprises:
   a roller positioned such that depressing the trigger engages the roller to push the second end of the actuator lever.

6. The charge handle of claim 1 wherein the trigger mechanism further comprises:
   a spring positioned to bias the trigger such that depressing the trigger occurs against the spring bias.

7. The charge handle of claim 1 wherein the body has an elongated shape and includes a forward portion and a rearward portion, the receptacle being located at the forward portion.

8. The charge handle of claim 7 wherein the latch is rotatably mounted to the body at the forward portion and extends in the longitudinal direction, the first end of the latch forming a catch with a positive engagement member, the catch extending forward beyond the receptacle to secure the receptacle to the charge port.

9. The charge handle of claim 8 wherein the actuator lever is rotatably mounted to the body at the forward portion and extends in the transverse direction across the body.

10. The charge handle of claim 9 wherein the second end of the latch and the first end of the actuator lever compose a pin and slot arrangement such that rotating the actuator lever causes the latch to rotate.

11. The charge handle of claim 9 further comprising:
    a housing enclosing the body.

12. The charge handle of claim 9 wherein the trigger extends in the longitudinal direction along the rearward portion of the body.

13. The charge handle of claim 12 wherein the trigger mechanism further comprises:
    a roller positioned such that depressing the trigger engages the roller to push the second end of the actuator lever.

14. The charge handle of claim 12 wherein the trigger mechanism further comprises:
    a spring positioned to bias the trigger such that depressing the trigger occurs against the spring bias.

15. The charge handle of claim 1 wherein the body has an elongated shape and includes a forward portion and a rear ward portion, the receptacle being located at the forward portion;

wherein the latch is rotatably mounted to the body at the forward portion and extends in the longitudinal direction, the first end of the latch forming a catch, the catch extending forward beyond the receptacle to secure the receptacle to the charge port; and wherein the actuator lever is rotatably mounted to the body at the forward portion and extends in the transverse direction across the body.

16. The charge handle of claim 15 wherein the trigger extends in the longitudinal direction along the rearward portion of the body.

17. The charge handle of claim 16 wherein the trigger mechanism further comprises:

a roller positioned such that depressing the trigger engages the roller to push the second end of the actuator lever.

18. The charge handle of claim 16 wherein the trigger mechanism further comprises:

a spring positioned to bias the trigger such that depressing the trigger occurs against the spring bias.

* * * * *